US008095910B2

(12) United States Patent
Nathan et al.

(10) Patent No.: US 8,095,910 B2
(45) Date of Patent: Jan. 10, 2012

(54) INTERRUPTIBLE CLIENT-SIDE SCRIPTS

(75) Inventors: Adam D. Nathan, Kirkland, WA (US); John I. Montgomery, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/786,003

(22) Filed: Apr. 10, 2007

(65) Prior Publication Data
US 2008/0256513 A1    Oct. 16, 2008

(51) Int. Cl.
*G06F 9/44*    (2006.01)
(52) U.S. Cl. ........ 717/110; 717/107; 717/108; 717/109; 717/113; 717/115
(58) Field of Classification Search .................. 717/110, 717/115, 107, 108, 109, 113
See application file for complete search history.

(56) References Cited

U.S. PATENT DOCUMENTS

| | | | |
|---|---|---|---|
| 6,061,518 A | 5/2000 | Hoffman | |
| 6,141,698 A * | 10/2000 | Krishnan et al. | 719/331 |
| 6,266,681 B1 * | 7/2001 | Guthrie | 715/234 |
| 6,268,852 B1 * | 7/2001 | Lindhorst et al. | 715/744 |
| 6,434,738 B1 | 8/2002 | Arnow | |
| 6,631,512 B1 * | 10/2003 | Onyeabor | 717/100 |
| 6,951,014 B1 | 9/2005 | Sokolov | |
| 7,127,405 B1 * | 10/2006 | Frank et al. | 705/310 |
| 7,316,003 B1 * | 1/2008 | Dulepet et al. | 717/111 |
| 7,367,015 B2 * | 4/2008 | Evans et al. | 717/110 |
| 7,528,843 B1 * | 5/2009 | Kilgard et al. | 345/582 |
| 2001/0037490 A1 * | 11/2001 | Chiang | 717/2 |
| 2004/0059809 A1 | 3/2004 | Benedikt et al. | |
| 2004/0103401 A1 * | 5/2004 | Chilimbi et al. | 717/130 |
| 2004/0123041 A1 * | 6/2004 | Krishnaiyer et al. | 711/137 |
| 2004/0128597 A1 | 7/2004 | Swoboda et al. | |
| 2004/0226459 A1 * | 11/2004 | Hill et al. | 100/116 |
| 2005/0028137 A1 * | 2/2005 | Evans et al. | 717/110 |
| 2005/0034109 A1 * | 2/2005 | Hamilton et al. | 717/140 |
| 2005/0039164 A1 * | 2/2005 | Cosimo et al. | 717/110 |
| 2005/0273757 A1 | 12/2005 | Anderson | |
| 2006/0026557 A1 | 2/2006 | Petri | |
| 2006/0136886 A1 * | 6/2006 | Patterson et al. | 717/141 |
| 2006/0294500 A1 * | 12/2006 | Chiang | 717/109 |
| 2007/0016949 A1 | 1/2007 | Dunagan et al. | |
| 2007/0074169 A1 * | 3/2007 | Chess et al. | 717/126 |

OTHER PUBLICATIONS

Rajarajan Vijayakuma, "Automating Currinculum Management Tasks", Dec. 2006, 82 pages.*
"Creating a Web Application Project", 2005, pp. 45-82.*

(Continued)

*Primary Examiner* — Phillip Nguyen

(57) ABSTRACT

Various technologies and techniques are disclosed for creating interruptible client-side scripts. Input is received from a developer to write original code for a web application in at least one client-side script. A code injection process is programmatically performed to modify the original code to make one or more parts of an execution of the code interruptible in the client-side script. The code injection process parses a code segment of a client-side script to retrieve a next code segment. If the next code segment has at least one conditional semantic construct, then code is injected in the form of one or more script functions that will transition execution flow from the original code segment into the one or more script functions that are operable to interrupt execution of the client-side script upon user request. The modified code resulting from the code injection process is saved for the web application.

16 Claims, 7 Drawing Sheets

OTHER PUBLICATIONS

Cook, "A Web Developer's Guide to Cross-Site Scripting", SANS Institute, 2003, GSEC Version 1.4b (Option 1).*

Huang et al., "Web Application Security Assessment by Fault Injection and Behavior Monitoring", May 2004, ACM.*

McFarlane Nigel, "Ten Mysteries of about: Config", Date: 2005, p. 7, vol. 2005, Issue 133, http://delivery.acm.org/10.1145/1070000/1064873/8004.html?key1=1064873&key2=5543930711&coll=GUIDE&dl=GUIDE&CFID=10469533&CFTOKEN=25613237.

Wong, et al., "Marmite: End-User Programming for the Web", Date: Apr. 22-27, 2006, pp. 1541-1546, http://delivery.acm.org/10.1145/1130000/1125733/p1541-hong.pdf?key1=1125733&key2=3852930711&coll=GUIDE&dl=GUIDE&CFID=10468878&CFTOKEN=68973839.

Paul Wilton, Chapter 1 "Introduction to JavaScript and the Web", in "Beginning JavaScript" 2nd Edition, May 2004, pp. 1-18.

* cited by examiner

INTERRUPTIBLE CLIENT-SIDE SCRIPTS

BACKGROUND

Web applications that are written with client-side scripts such as JavaScript, VBScript, and so on run within the context of a web browser. These scripts are tightly coupled with the processes and threads of the web browser. In other words, if the script in a particular web application performs some operation that takes a long time to finish or that will never finish because of a logic error, there is no easy way to halt execution. This can cause problems for both end users of the web application and for developers debugging the web application. The end user of a web application that has appeared to "hang" waits and wonders if something else is actually going to ever happen, or they may close out of the browser and possibly re-start the process. Developers debugging a web application that has appeared to "hang" do not have an easy way of entering debug mode at that point to see what is actually causing the delay.

SUMMARY

Various technologies and techniques are disclosed for creating interruptible client-side scripts. Input is received from a developer to write original code for a web application in at least one client-side script. A code injection process is programmatically performed to modify the original code to make one or more parts of an execution of the code interruptible in the client-side script. The code injection process parses a code segment of a client-side script to retrieve a next code segment. If the next code segment has at least one conditional semantic construct, then code is injected in the form of one or more script functions that will transition execution flow from the original code segment into the one or more script functions that are operable to interrupt execution of the client-side script upon user request. The parsing and injecting code stages are repeated for any additional code segments that contain at least one conditional semantic construct. The modified code resulting from the code injection process is saved for the web application.

In one implementation, a user of the web application can cancel and/or pause the flow of execution of the web application because of the code that was injected during the development process. The user can be an end user accessing the web application in a live mode and/or a developer debugging the application in a debug mode.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
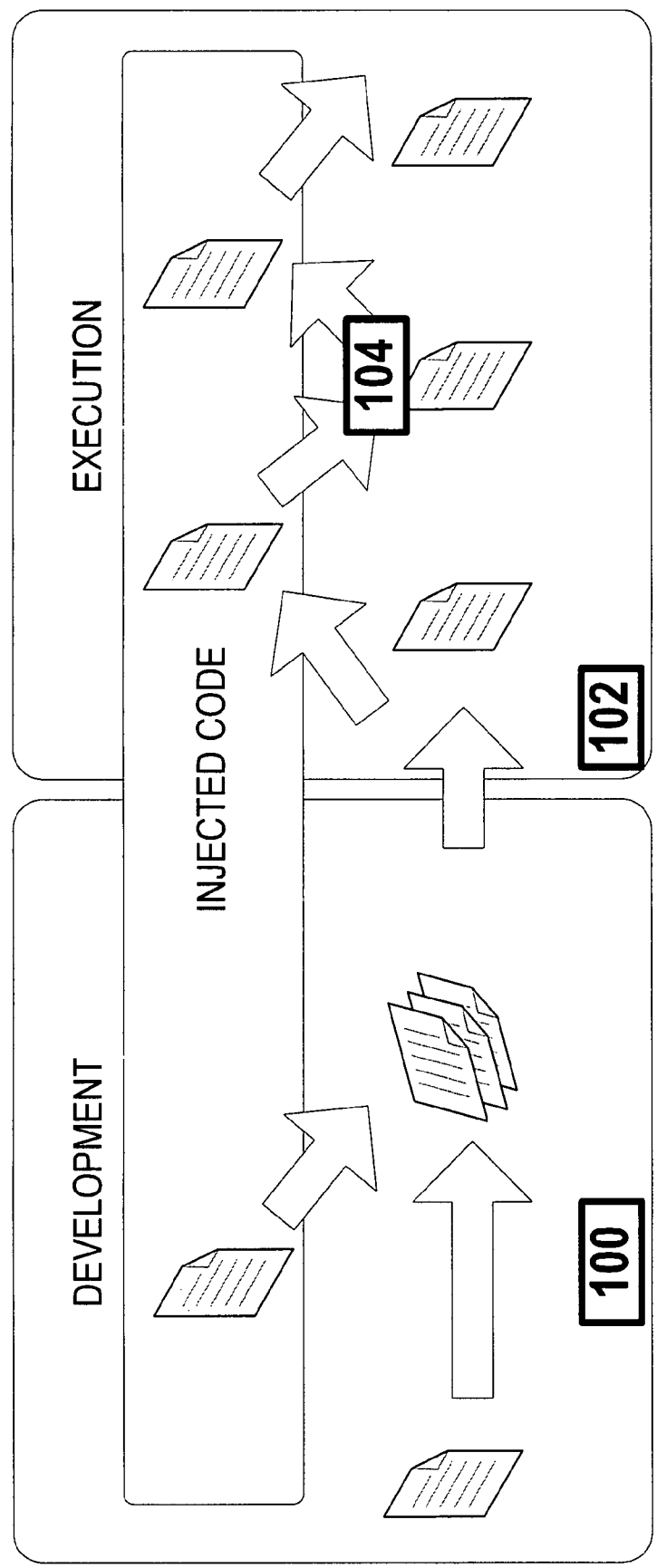
FIG. 1 is a diagrammatic view of an interruptible client-side script that is created and accessed using one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that allows an interruptible client-side script to be created and/or used, but the system also serves other purposes in addition to these. In one implementation, one or more of the techniques described herein can be implemented as features within a software development application such as MICROSOFT® VISUAL STUDIO®, or from any other type of program or service that allows for the creation of web applications. In another implementation, one or more of the techniques described herein are implemented as features with other applications that provide web applications to client browsers.

In one implementation, a system is provided that injects additional code to areas where conditional semantic constructs are found in the application to allow those portions of code to be interrupted by a user who later executes the application. Examples of conditional semantic constructs include if . . . then statements, for statements, and while loops, which are particularly prone to accidental infinite loops or other errors that can cause an application to hang execution. The system locates these sections of code, and then inserts calls to an interrupt function that will later allow the user executing the application to pause and/or cancel execution whenever these conditional semantic constructs are encountered. The code can be inserted automatically upon saving the web application from the software development environment, and/or upon specific selection of a code injection process option by the user. A software developer can use one or more of these techniques to debug an application that contains a logic error and continues to execute a certain conditional construct more than desired. Alternatively or additionally, an end user can use one or more of these techniques to cancel and/or pause a web application that appears to have an operation that caused the system to lock up.

FIG. 1 is a diagrammatic view of a system of one implementation. The system has a software development environment 100, which is used by the developer to write the original functionality of the web application. The software development environment 100 then injects the transition code to add the interrupt functionality. The code (including the modifications for the interrupt functionality) for the web application is deployed to a web server so that an end user can execute the application. The web server can be a separate computer from the development computer, or the same computer depending on the scenario. The modified code is then passed to the browser 102 for execution, such as a browser operated by an end user running the application or a software developer debugging the application. The client browser then executes the transitions 104 that were injected to make the conditional semantic constructs interruptible. During one of these transitions, the user can cancel and/or pause execution of the web application, as described in further detail in FIGS. 2-6.

Figure 2:
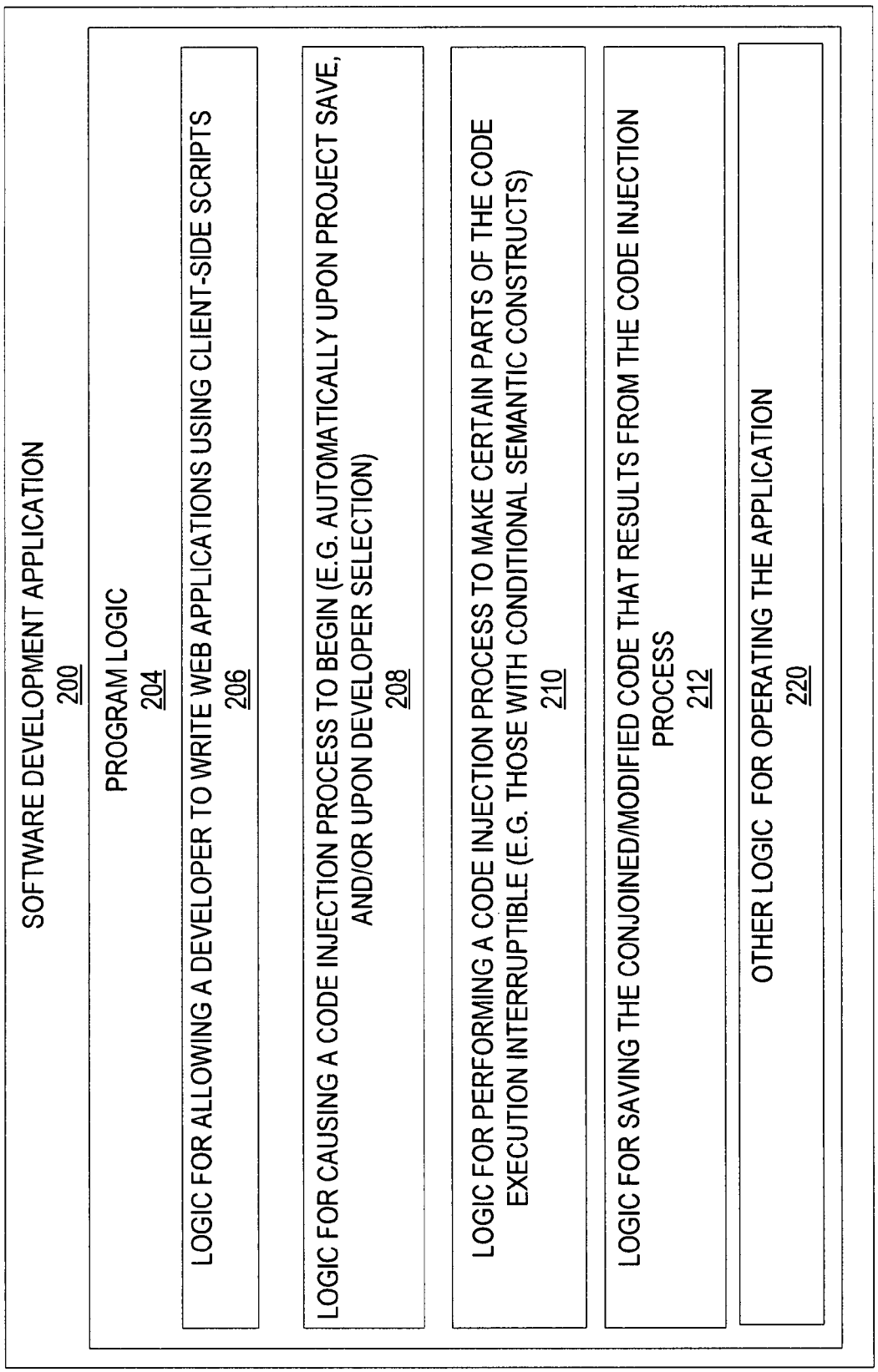
FIG. 2 is a diagrammatic view of a software development application of one implementation.

Turning now to FIG. 2, software development application 200 operating on computing device 100 is illustrated. In one implementation, software application 200 is one of the application programs that reside on computing device 400 (of FIG. 7). However, it will be understood that software development application 200 can alternatively or additionally be embodied as computer-executable instructions on one or more computers and/or in different variations than shown on FIG. 7. Alternatively or additionally, one or more parts of software development application 200 can be part of system memory 404 (of FIG. 7), on other computers and/or applications 415 (of FIG. 7), or other such variations as would occur to one in the computer software art.

Software development application 200 includes program logic 204, which is responsible for carrying out some or all of the techniques described herein. Program logic 204 includes logic for allowing a developer to write web applications using client-side scripts 206; logic for causing a code injection process to begin (e.g. automatically upon project save, and/or upon developer selection 208; logic for performing a code injection process to make certain parts of the code execution interruptible (e.g. those with conditional semantic constructs) 210; logic for saving the conjoined/modified code that results from the code injection process 212; and other logic for operating the application 220. In one implementation, program logic 204 is operable to be called programmatically from another program, such as using a single call to a procedure in program logic 204.

Figure 3:
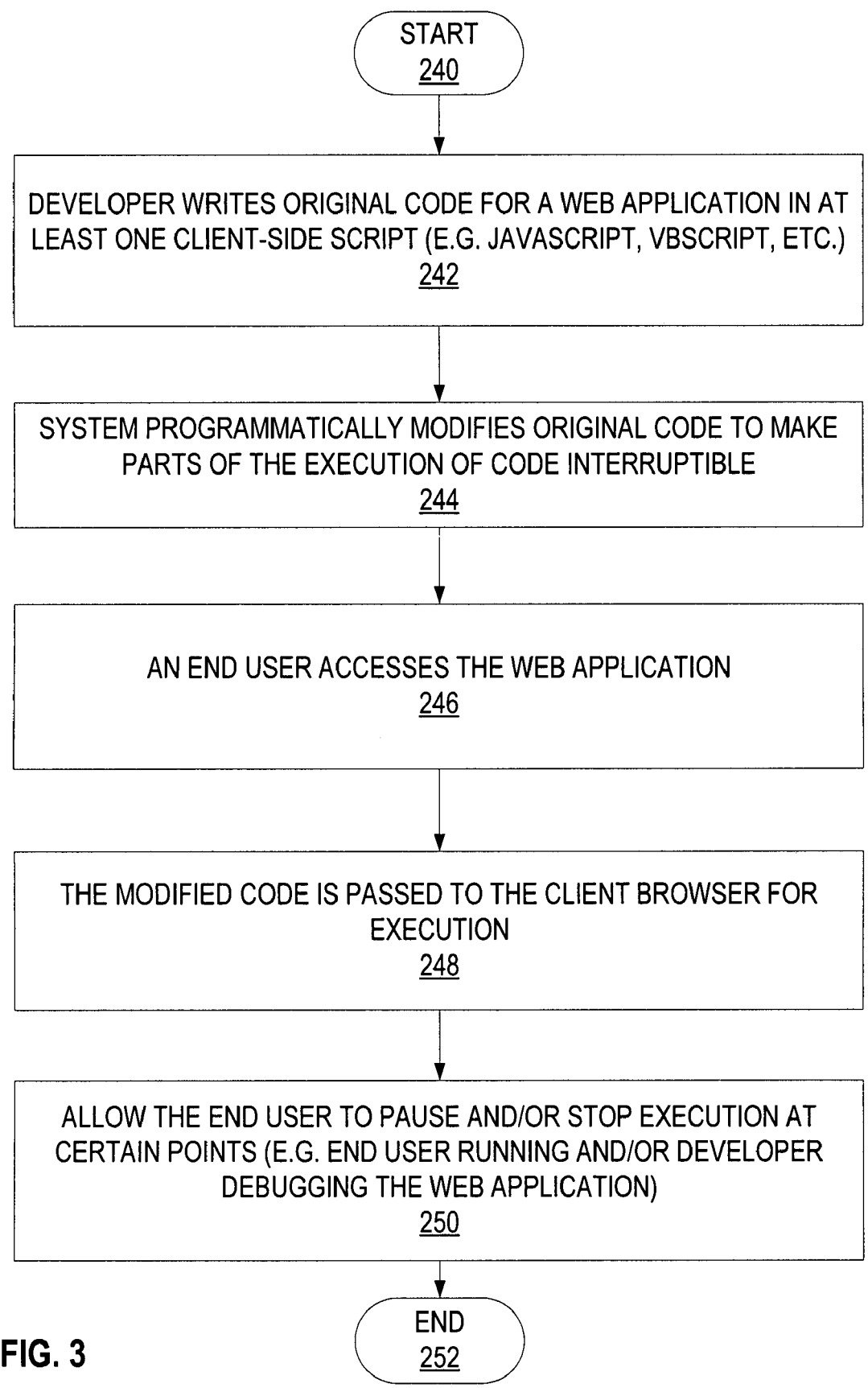
FIG. 3 is a high-level process flow diagram for one implementation.

Turning now to FIGS. 3-6, the stages for implementing one or more implementations of the system of FIG. 1 are described in further detail. FIG. 3 is a high level process flow diagram for the system of FIG. 1. In one form, the process of FIG. 3 is at least partially implemented in the operating logic of computing device 400 (of FIG. 7). The process begins at start point 240 with the developer writing the original code for a web application in at least one client-side script (e.g. in JavaScript, VBScript, etc.) (stage 242). The system programmatically modifies the original code to make parts of the execution of code interruptible (stage 244). An end user accesses the web application (stage 246). The modified code is passed to the client browser for execution (stage 248). The end user can pause and/or stop execution at certain points (e.g. the end user running and/or developer debugging the web application) (stage 250). The process ends at end point 252.

Figure 4:
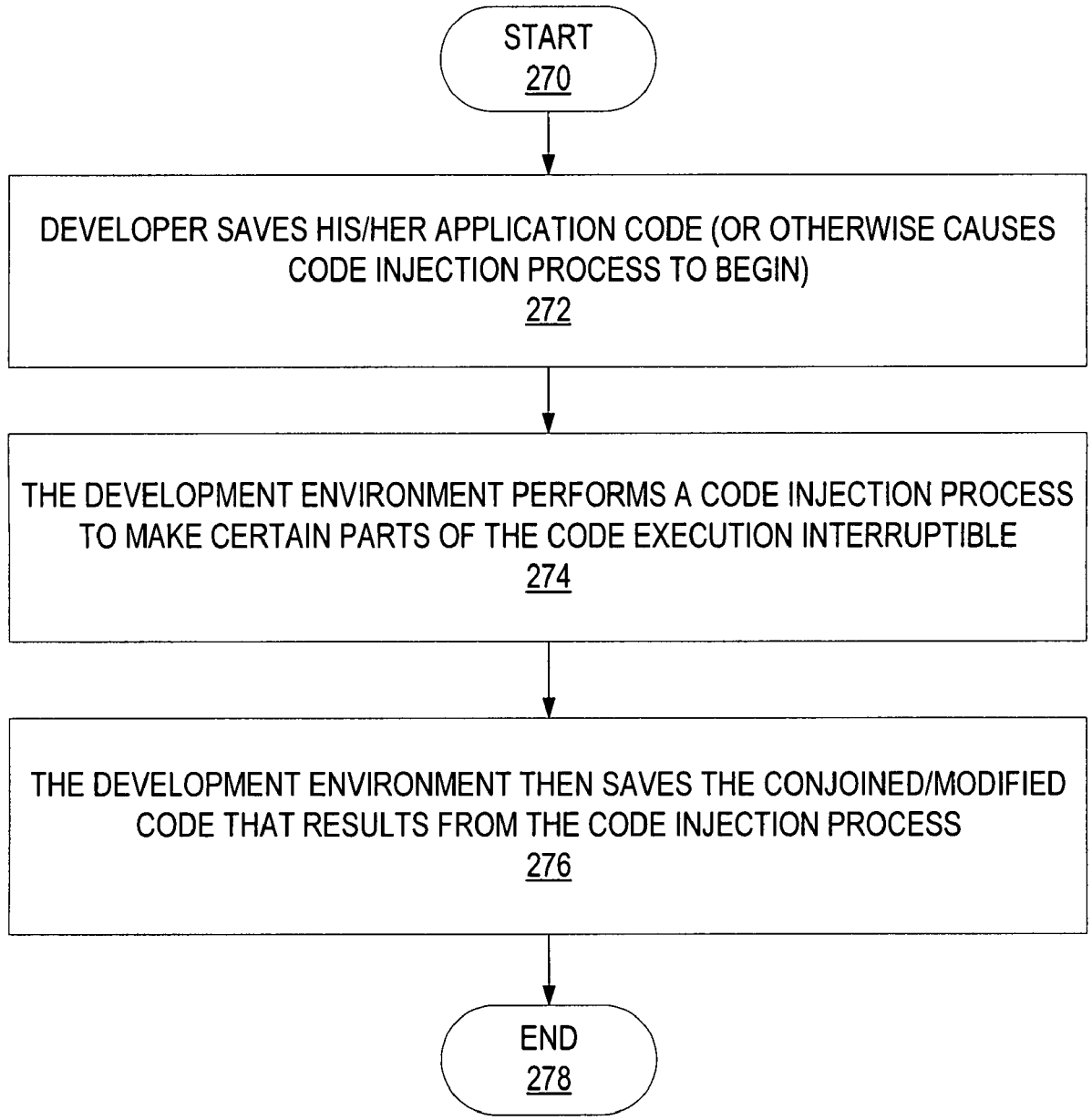
FIG. 4 is a process flow diagram for one implementation illustrating the stages involved in using a software development application to create an interruptible client-side script.

FIG. 4 illustrates one implementation of the stages involved in using a software development application to create an interruptible client-side script. In one form, the process of FIG. 4 is at least partially implemented in the operating logic of computing device 400 (of FIG. 7). The process begins at start point 270 with the developer saving his/her application code (or otherwise causing a code injection process to begin) (stage 272). The development environment performs a code injection process to make certain parts of the code execution interruptible (stage 274). The development environment then saves the conjoined/modified code that result from the code injection process (stage 276). The process ends at end point 278.

Figure 5:
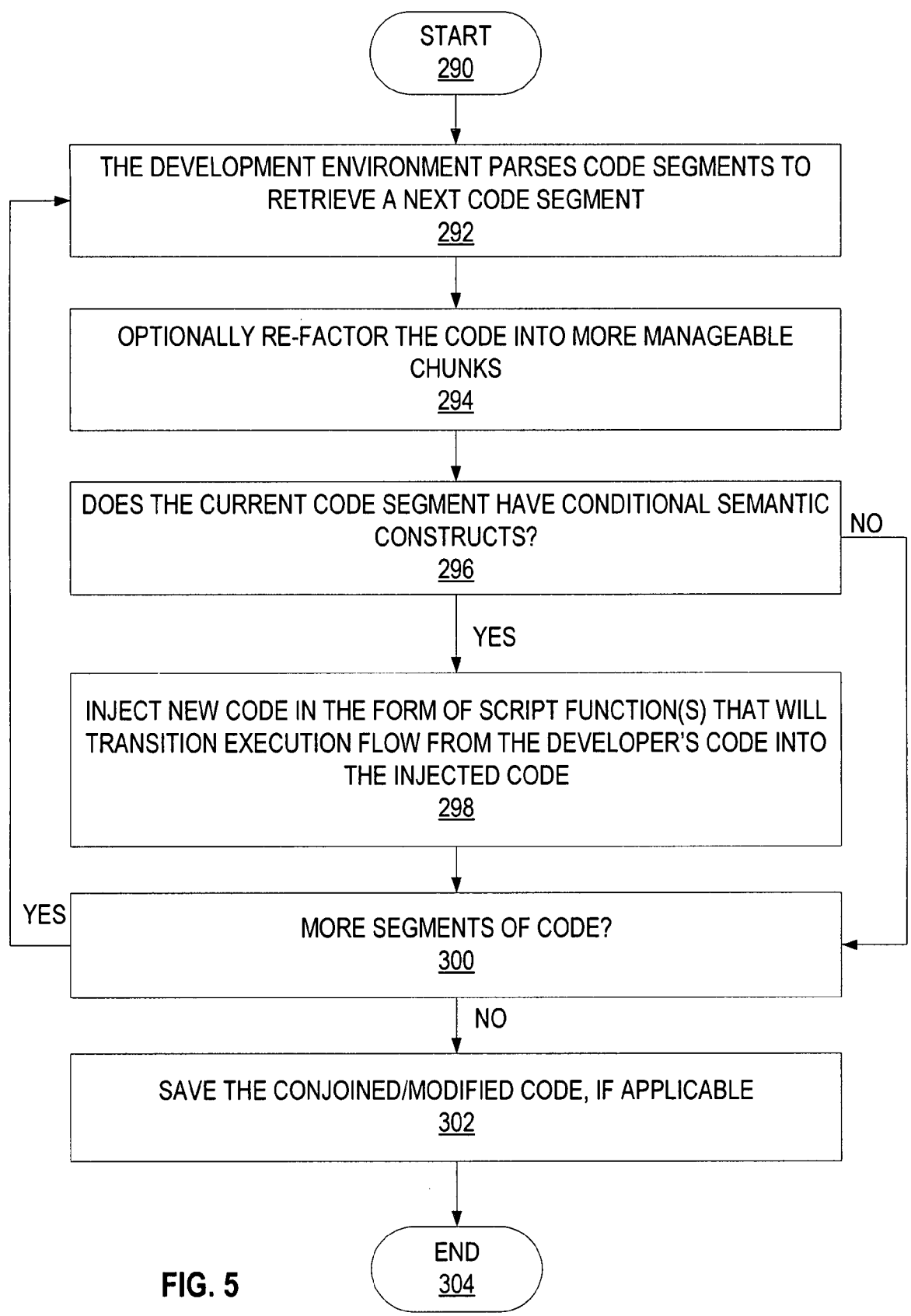
FIG. 5 is a process flow diagram for one implementation illustrating the stages involved in performing a code injection process to make the client-side script interruptible.

FIG. 5 illustrates one implementation of the stages involved in performing a code injection process to make the client-side script interruptible. In one form, the process of FIG. 5 is at least partially implemented in the operating logic of computing device 400 (of FIG. 7). The process begins at start point 290 with the development environment parsing code segments to retrieve a next code segment (stage 292). The code is optionally re-factored into more manageable chunks (stage 294). If the current code segment has conditional semantic constructs (decision point 296), then the software development application 200 injects new code in the form of script function(s) that will transition execution flow from the developer's code into the injected code (stage 298). The stages repeat as more segments of code are parsed (decision point 300). After all code segments are processed, the conjoined/modified code is then saved, if applicable (stage 302). The process ends at end point 304.

Figure 6:
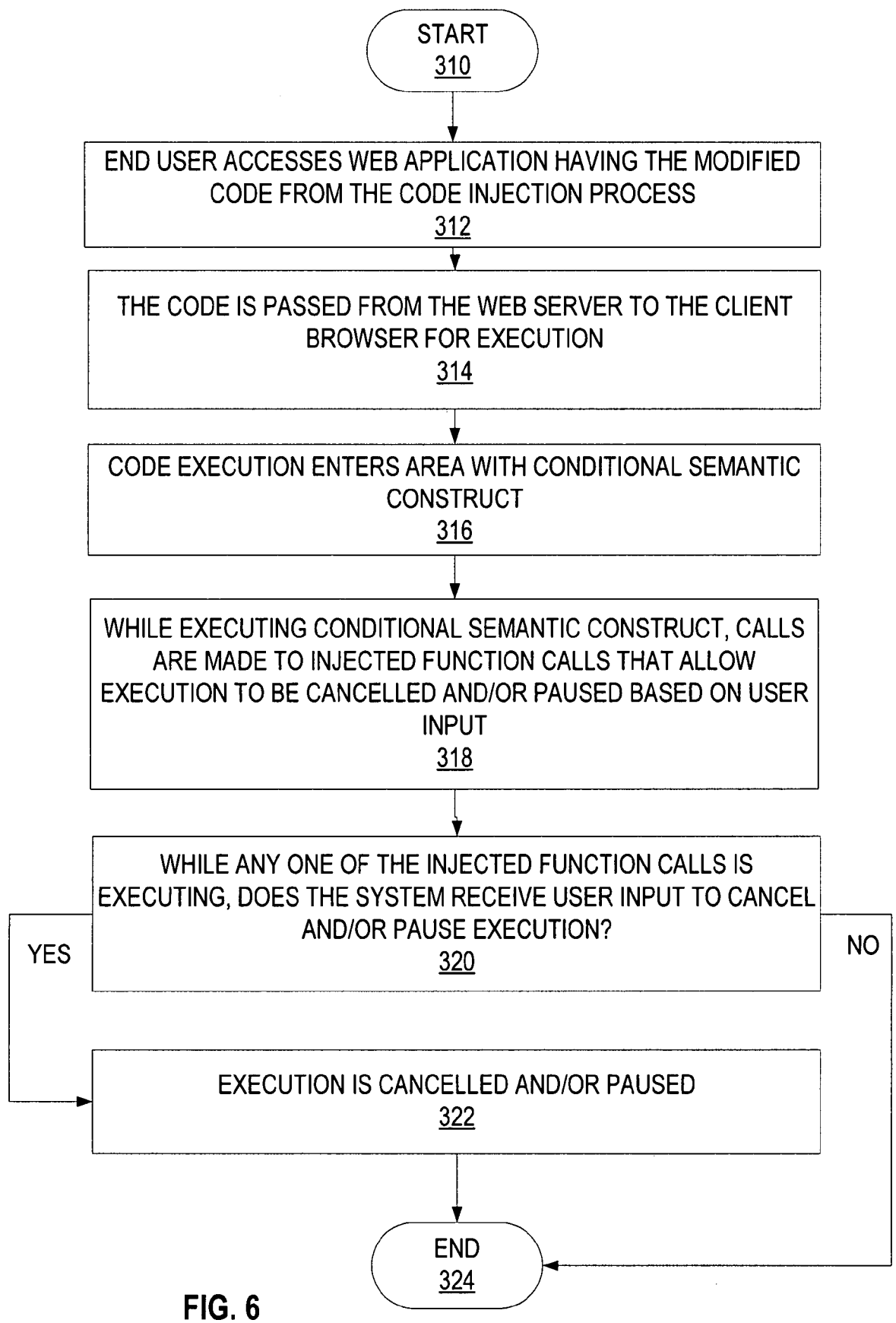
FIG. 6 is a process flow diagram for one implementation illustrating the stages involved in allowing a user to interrupt execution of a web application.

FIG. 6 illustrates one implementation of the stages involved in allowing a user to interrupt execution of a web application. In one form, the process of FIG. 6 is at least partially implemented in the operating logic of computing device 400 (of FIG. 7). The process begins at start point 310 with the end user accessing a web application having the modified code from the code injection process (stage 312). The code is passed from the web server to the client browser for execution (stage 314). Code execution enters an area with conditional semantic construct (stage 316). While executing conditional semantic constructs, calls are made to injected function calls that allow execution to be cancelled and/or paused based on the user input (stage 318). While any one of the injection function calls is executing, if the system receives user input to cancel and/or pause execution (decision point 320), then application execution is cancelled and/or paused accordingly (stage 322). The process ends at end point 324.

Figure 7:
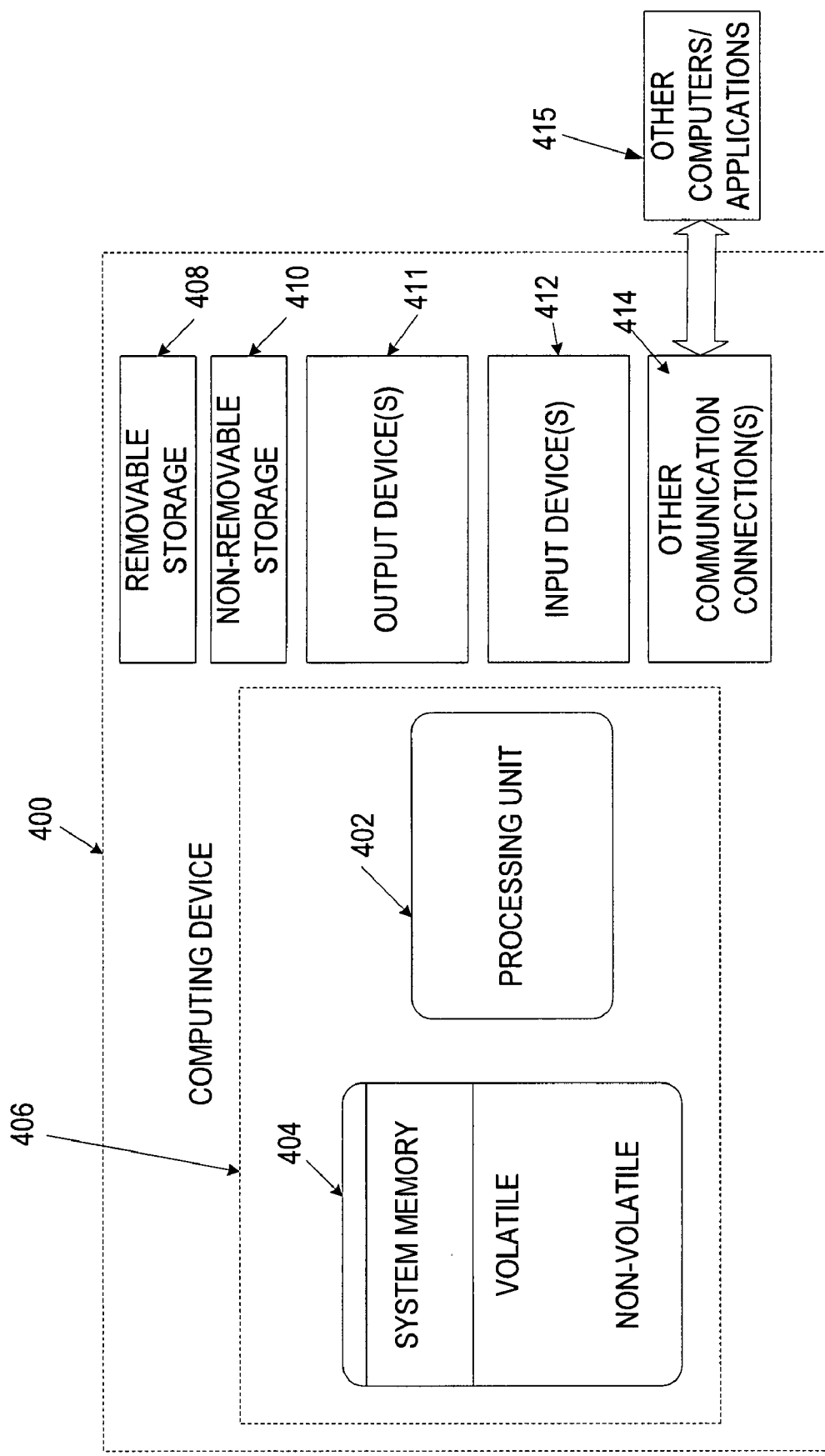
FIG. 7 is a diagrammatic view of a computer system of one implementation for executing the software development application of FIG. 2 and/or one or more parts of processes described in FIGS. 3-6.

As shown in FIG. 7, an exemplary computer system to use for implementing one or more parts of the system of FIG. 1 includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as ROM, flash memory, etc.) or some combination of the two. This most basic configuration is illustrated in FIG. 7 by dashed line 406.

Additionally, device 400 may also have additional features/ functionality. For example, device 400 may also include additional storage (removable and/or non-removable) including, but not limited to, magnetic or optical disks or tape. Such additional storage is illustrated in FIG. 7 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Computing device 400 includes one or more communication connections 414 that allow computing device 400 to communicate with other computers/applications 415. Device 400 may also have input device(s) 412 such as keyboard, mouse, pen, voice input device, touch input device, etc. Output device(s) 411 such as a display, speakers, printer, etc. may also be included. These devices are well known in the art and need not be discussed at length here. In one implementation, computing device 400 includes software development application 200.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for creating an interruptible client-side script comprising the steps of:
   receiving input from a developer to write original code for a web application in at least one client-side script;
   during creation of the web application, programmatically performing a code injection process to modify the original code to make one or more parts of an execution of the original code interruptible in the client-side script, wherein the code injection process modifies one or more original code sections that contain conditional semantic constructs, wherein the original code sections are modified to call a transition process that will allow a user operating the web application from a web browser to cancel an execution of the conditional semantic construct; and
   saving the modified code resulting from the code injection process for the web application.

2. The method of claim 1, wherein the at least one client-side script is written in JavaScript.

3. The method of claim 1, wherein the at least one client-side script is written in VBScript.

4. The method of claim 1, wherein code injection process comprises:
   parsing a plurality of code segments to retrieve a particular code segment; and
   if the particular code segment has at least one conditional semantic construct, then injecting one or more script functions that will transition execution flow from the original code to the one or more script functions.

5. The method of claim 4, wherein the parsing and injecting stages are repeated for a plurality of conditional semantic constructs.

6. The method of claim 1, wherein the code injection process begins automatically upon saving of the web application.

7. The method of claim 1, wherein the code injection process begins when the developer selects an option to begin the code injection process.

8. The method of claim 1, wherein the code injection process re-factors the original code into more manageable chunks.

9. The method of claim 1, wherein the modified code is sent to the client browser of a user accessing the web application.

10. The method of claim 9, wherein the user is an end user accessing the web application in a live mode.

11. The method of claim 9, wherein the user is the developer accessing the web application in a debug mode.

12. A computer storage medium having computer-executable instructions for causing a computer to perform the steps recited in claim 1.

13. A computer storage medium having computer-executable instructions for causing a computer to perform steps comprising:
   receive input from a developer to write original code for a web application using one or more client-side scripts;
   during creation of the web application, cause a code injection process to begin, wherein the code injection process is operable to begin automatically upon saving of the web application;
   during creation of the web application, perform the code injection process to make certain parts of an execution of the original code interruptible, wherein the code injection process modifies one or more original code sections that contain conditional semantic constructs, wherein the original code sections are modified to call a transition process that will allow a user operating the web application from a web browser to cancel an execution of the conditional semantic construct; and
   during creation of the web application, save the modified code that results from the code injection process.

14. The computer storage medium of claim 13, wherein the code injection process is operable to parse a plurality of code segments to retrieve a particular code segment, and if the particular code segment has at least one conditional semantic construct, then injecting one or more script functions that will transition execution flow from the code to the one or more script functions.

15. A method for performing a code injection process to make a client-side script interruptible comprising the steps of:
   receive input from a developer to write original code for a web application using one or more client-side script;
   during creation of the web application, parsing an original code segment of a particular client-side script to retrieve a next original code segment;
   if the next original code segment has at least one conditional semantic construct, then, during creation of the web application, modifying one or more original code sections that contain the at least one conditional semantic construct, wherein the code sections are modified to call a transition process that will allow a user operating the web application from a web browser to cancel an execution of the at least one conditional semantic construct;
   repeating the parsing and injecting code stages for any additional code segments that contain at least one conditional semantic construct; and
   during creation of the web application, save the modified original code.

16. A readable computer storage medium having computer-executable instructions for causing a computer to perform the steps recited in claim 15.

* * * * *